Patented June 8, 1954

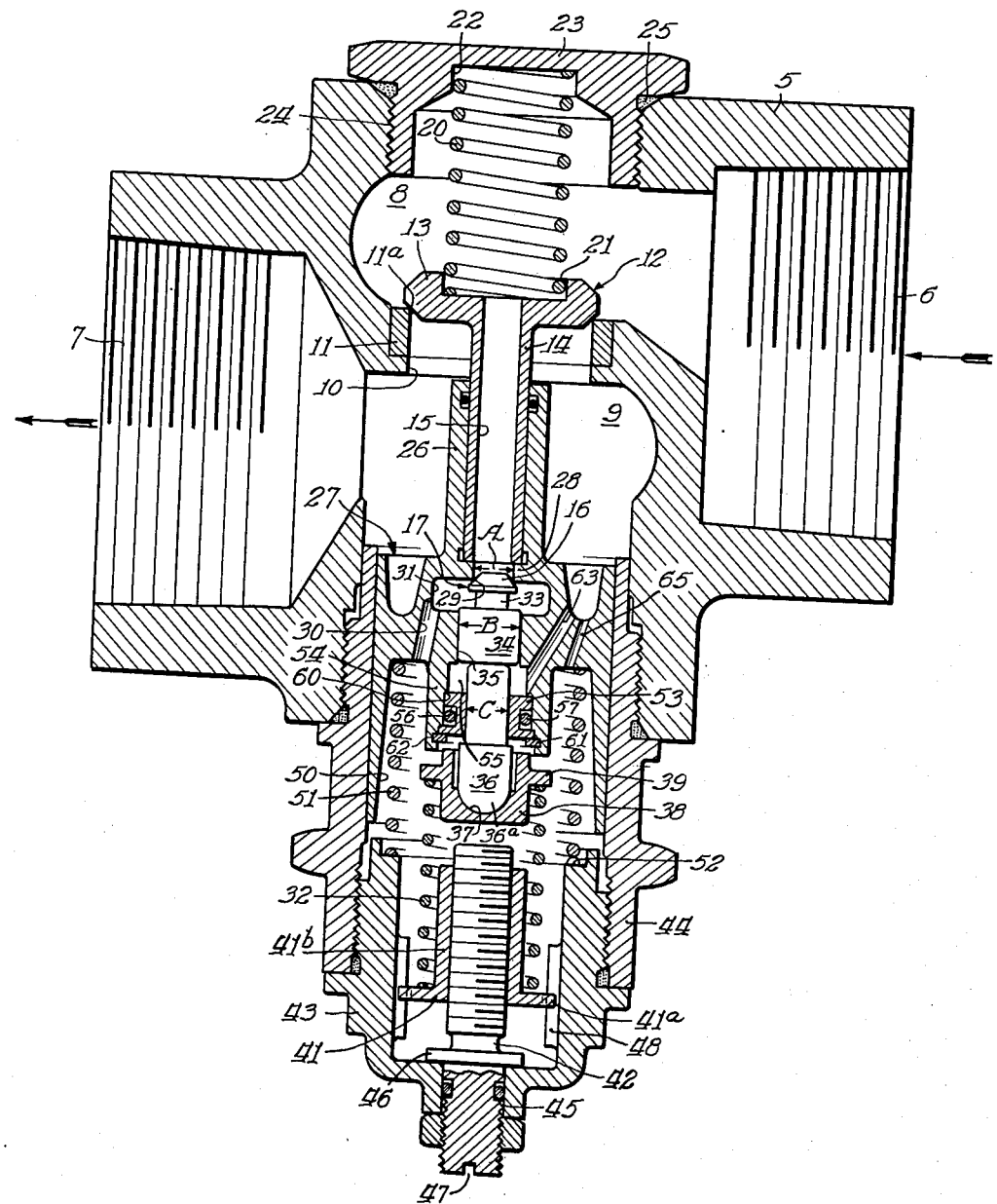

2,680,453

UNITED STATES PATENT OFFICE 2,680,453

SAFETY RELIEF VALVE

Edward Anthony Prijatel, South Euclid, Ohio, assignor to Borg-Warner Corporation, Chicago, Ill., a corporation of Illinois Application April 13, 1950, Serial No. 155,729

3 Claims. (Cl. 137—490)

This invention relates to a relief valve for a hydraulic system and more particularly to an improved relief valve of the type wherein the system pressure up to the desired relief level is employed to hold the relief valve closed.

Relief valves as ordinarily constructed are comprised of a valve body and a cooperating valve seat inserted in the hydraulic system to be safeguarded at any convenient place in hydraulic communication with the fluid in the system, and serve to expose a return port or opening upon the occurrence of an excessive pressure. The valve is responsive to pressures existing within the system and the total pressure against the valve is balanced by means of a spring; when the spring pressure is overcome by the total pressure against the valve, the valve opens. As pointed out in U. S. Patent No. 2,360,816, it has been found that under certain conditions the natural period of the spring may substantially equal the natural period of the fluid in the system when set in motion and then arrested by the opening and closing of the valve (hydraulic ram action). This resonant condition may tend to build up and result in undesirable noise and wear of the valve.

To obviate the foregoing difficulty, it has been proposed to provide a relief valve wherein the pressure within the system is utilized to keep the valve closed so that instead of acting in a direction to open the valve, the valve is so arranged that the fluid pressure tends to keep the valve closed, and opening of the valve is effected through a bypass valve which opens to permit fluid pressure to be admitted to the under side of the valve to force it open. By this arrangement, a relatively light spring may be used having a rate which will be substantially different from the natural frequency of the hydraulic system to avoid setting up any resonant condition. However, relief valves of this type have heretofore been relatively difficult to construct and, it has been found in practice, difficult to adjust to different desired relief values.

An object of the present invention is to provide a new and improved relief valve of the type utilizing the system pressure to hold the valve closed until the relief pressure value is reached.

In accordance with one embodiment of this invention, such a valve may comprise a primary relief valve so disposed as to seat in response to system pressure and having associated therewith a piston to which pressure may be applied by means of an auxiliary or control valve to cause rapid opening of the primary valve upon the relief pressure level being reached in the system. The relief pressure level is set by increasing or reducing the compression on a control spring, and the control valve is arranged so that the working length of the control spring remains substantially the same whether the valve be open or closed, thus providing an extremely close control of valve operation.

Other objects and advantages of the present invention will be apparent from the following detail description thereof taken in conjunction with the drawing wherein the single figure is an axial, sectional view of a relief valve constructed in accordance with this invention.

Referring to the drawing, it will be seen that the improved relief valve of this invention comprises a housing 5 having an inlet port 6 formed on the right side thereof, which port may be connected into a hydraulic pressure system by a suitable pressure line (not shown) and an outlet or return port 7 on the left side thereof, which port 7 may be connected to the sump (not shown) of a hydraulic system. Interconnecting these ports 6 and 7 are an upper chamber 8 communicating at its right side with the port 6 and a lower, somewhat larger chamber 9 communicating at its left side with the return port 7. The two chambers 8 and 9 are connected by a throat or aperture 10 in which is mounted sleeve insert 11, the insert 11 providing at its upper, inner edge a valve seat 11–a. A primary relief valve 12 is arranged to seat on the valve seat 11–a and thereby to close the passage through the valve from the inlet port 6 to the outlet port 7.

The relief valve 12 has a large, dish-shaped or flanged head 13 arranged to seat at its under side on seat 11–a and an elongated stem 14 which extends downwardly, as viewed in the drawing, into the lower chamber 9. An axially extending aperture 15, formed in stem 14, communicates at its upper end with inlet chamber 8 and at its lower end communicates pressure to the head 16 of an auxiliary or control valve 17.

The primary valve 12, seating on the upper end of valve seat insert 11, is arranged to seat in response to system pressure applied through port 6. Aiding this tendency of the valve 12 to seat, and insuring that the valve will be initially seated is a helically coiled spring 20, the lower end of which bears against the upper side of the disc portion 13 of valve 12, being received in a cylindrical recess 21 formed therein coaxially of the aperture 15 and the upper end of which spring is received in a similar cylindrical recess 22 formed in a retainer cap 23, which is threaded into a suitable opening 24 formed in the upper end of the valve housing 5. Packing 25 disposed between the flanged head of the retainer cap 23 and the inner edge of the opening 24 prevents leakage of pressure.

The downwardly extending valve stem 14 of the relief valve 12 is journalled in an upwardly extending sleeve portion 26 of a piston 27 disposed within the lower portion of housing 5. Piston 27 is employed in accordance with this invention to lift the relief valve 12 off its seat when the desired relief pressure level is reached in the system. The lower terminal end of valve stem 14 rests directly on an inwardly extending shoulder or flange 28 integrally formed at the lower end of the sleeve portion 26 of piston 27 and, thus, upward movement of piston 27 is effective to cause the relief valve 12 to move upwardly off its seat, the piston flange 28 being held in contact with the lower end of valve stem 14 by a spring 51 described in detail hereinafter. The inwardly extending flange 28 defines at its lower edge a valve seat 29 for the truncated, conical head 16 of the control valve 17. When the control valve 17 is moved downwardly relatively to the valve seat 29, system pressure from the port 6 is communicated to the under side of piston 27 through a short, angularly disposed passage 30 in the head of piston 27, the passage 30 communicating at its upper end with a chamber 31, formed in the head of piston 27, into the upper end of which chamber the lower end of the passage 15 in the relief valve stem opens when control valve 17 is unseated. Control valve 17 is held closed by a control spring 32 until the desired relief pressure level is reached in the system, thus preventing pressure from reaching the under side of piston 27 and preventing unseating of the primary relief valve 12.

Referring particularly to the control valve 17, it will be seen that valve 17 has extending downwardly from the head 16 a short intermediate stem portion 33 of substantially smaller cross-section than the lower portion of the valve head 16 and the stem portion 33 has integrally formed therewith at its lower end a substantially larger diameter lower end portion 34 of generally cylindrical configuration. End portion 34 is journalled in an opening 35 formed in the cross portion or head of piston 27 in axial alignment with valve seat 29. The control valve 17 is supported on the upper end of a generally rod-shaped member 36, the cross-sectional area of which is critically selected with reference to the areas of the control valve and the control valve stem to achieve the desired operating characteristics as explained hereinafter. The lower end portion 36-a of member 36 is enlarged as compared with the upper end portion and the lower end 36-a is rounded and received in a suitable cup-shaped recess 37 formed in a retainer member 38 having a peripheral flange 39 against the under side of which the upper end of the control spring 32 bears. The lower end of control spring 32 bears against a flanged, lower portion 41-a of an axially elongated adjusting nut 41, the body portion 41-b of which is threaded on the externally threaded upper portion of an adjusting screw 42. Adjusting screw 42 is in turn rotatably mounted in a generally cylindrical or cup-shaped retainer or closure cap 43 threaded into the lower end of a sleeve 44, the upper end of which sleeve is threaded into or otherwise firmly secured to the lower side of the housing. Piston 27 is slidably journalled in the upper portion of this sleeve or cylinder 44.

Retainer cap 43 has a centrally disposed opening 45 through which the lower end of adjusting screw 42 extends, while adjusting screw 42 has a flange 46 formed about the lower mid portion thereof, the under side of which flange rests on the upper, inner side of the retaining cap 43 in bearing relation. The terminal end of the adjusting screw 42 is provided with a slot 47 to receive the tip of a screw-driver whereby adjusting screw 43 may be rotated to raise or lower the nut 41, the periphery of which is keyed to the retainer cap 43 by a pair of oppositely disposed keyways 48 fitting into suitable slots in the flanged portion 41-a of the nut 41. Accordingly, since the nut 41 is prevented from turning relatively to the cap 43, rotation of the adjusting screw 42 will cause the nut 41 to be moved upwardly or downwardly, in accordance with the direction of rotation, to increase or reduce the compression on spring 32, and thus to set the value or level at which the control valve 17 may open in response to pressure applied to the upper end thereof.

Referring now to the piston 27, which is slidably journalled in the upper portion of the sleeve portion 44 of the housing 5, it will be noted that the under side of the piston is provided with a deep, relatively wide, annular recess 50 in which the upper portion of a spring 51 is received, the upper end of spring 51 bearing against the upper end of the recess 50. Spring 51 holds piston 27 firmly against the lower end of valve stem 14 at all times. The lower end of spring 51 bears against the upper end of cap 43, being retained in axial alignment therewith by an annular shoulder 52 of relatively narrow cross-section formed about the upper end of the cap 43 on the inner dimension thereof. The spring 51 is selected with reference to the compression force exerted by the spring 20 associated with the primary relief valve 12 and, in combination with control spring 32, exerts a force only slightly less than the oppositely directed pressure exerted by the spring 20 on the relief valve 12 and the piston 27. In this manner, while the relief valve is initially held seated, the opening of the relief valve is in response primarily to the fluid pressures substantially unaffected by the several springs, which largely counterbalance each other.

It will be noted that the rod-like member 36 associated with and forming, in effect, a part of the valve stem of control valve 17 is maintained in axial alignment with the control valve stem by a bearing or bushing 53 mounted in a downwardly depending cylindrical or tubular portion 54 of the piston 27, the outer periphery of the tubular portion 54 defining the radially inner side of the recess 50 formed in the under side of piston 27 and the inner side of the downwardly depending portion 54 defining a chamber 55 communicating at its upper end with the aperture 35 in which the enlarged, lower end 34 of the valve stem of the control valve 17 is journalled. Bushing 53 serves both as a journal bearing surface for the upper portion of stem member 36 and also as a packing retainer member, the bushing 53 having a groove 56 formed about the periphery thereof in which an O-ring 57 is disposed and retained. The upper end of the bushing 53 seats against an inwardly extending shoulder 60 integrally formed with the inner side of the downwardly depending portion 54 of the piston 27 and the bushing is retained in its position by a split ring 61 mounted in a suitably located groove 62 formed on the inner side of the lower end of piston portion 54.

In order to prevent hydraulic locking of the action of control valve 17 and to permit escape of fluid leaking past the control valve 17, a short passage vent 63 is formed in the head of piston 27, the passage communicating at its upper end with the chamber 9 and at its lower end with the annular chamber 55 defined by the upper end portion of stem member 36, the annular, exposed lower surface of the enlarged portion 34 of the control valve stem and the upper, inner wall portion 54 of piston 27. In this manner, the chamber 55 is vented to low pressure.

In order to prevent pressure below the piston 27 resulting from the opening of the control valve 17 from affecting the operation of the control valve with reference to the upper surface area thereof which is exposed to inlet pressure, the relative pressure responsive areas A, B and C, respectively, of the control valve head 16, of the enlarged stem portion 34 and of the rod 36 are critically selected to provide ordinarily a balanced condition wherein the area B of the enlarged portion 34 less the area A of the exposed upper surface of control valve head 16 is equal to the effective area C of the stem of rod member 36. In this manner, the force produced by the pressure acting on area B after the opening of the control valve 17 is counter-balanced to the extent that the only effective force acting against spring 32 is that force produced by pressure acting on area A due to the effective, oppositely directed force produced by the pressure and area C. The under side of the enlarged portion 34 is not effective as a pressure responsive surface area since the chamber 55 is vented to low pressure. However, by changing the relation of area B and of area C, the control valve can be unbalanced to the pressure below the piston, which in some applications may be desirable. For example, if area C is made less than area B minus area A, then the relief valve would have the characteristic of tending to remain open once the control valve has admitted pressure to the under side of the piston until the pressure in the system with which the valve is associated reached a considerably lower pressure value than that required to cause opening of the valve. In other words, the system pressure would drop off sharply from the desired predetermined cracking pressure once this cracking pressure was reached and tend to remain at a lower pressure level. However, when the pressure in the system is reduced below this lower pressure level, then the control spring 32 would again become effective to close the control valve and the system pressure could then rise again to the predetermined cracking pressure.

The exposed area of the underside of the piston 27 is selected to exceed substantially the exposed area of the upper surface of relief valve 12 and, thus, upon application of a pressure to the under side of the piston 27, even though such pressure be somewhat less than the pressure exerted against the upper side of the relief valve 12, the relief valve 12 will be moved upwardly. In other words, because the area of piston 27 exceeds the relief valve 12, less pressure is required to move the piston upwardly than is required to hold the relief valve 12 in position. Accordingly, the opening action of this valve is very rapid.

In order to permit the piston 27 to return to its lower position upon closing of the control valve, a venting orifice 65 may be formed in the piston head, the orifice 65 communicating at its lower end with the upper end of annular recess 50 and at its upper end with the chamber 9. This orifice must necessarily be made of small diameter to prevent rapid escape of pressure therethrough during actuation of the piston. Venting is provided also by virtue of the necessary clearance between the periphery of the piston and the inner wall of the housing member 44, and in some cases may be adequate to avoid using the passage 65.

A feature of the present invention is that the working length of the control spring 32 tends to remain substantially constant despite opening of the control valve 17. This desirable operating condition is attained because initial opening of the control valve, that is, downward movement thereof in response to the system pressure exceeding the counter pressure provided by spring 32, is immediately followed by upward movement of the piston 27. Upward movement of piston 27 moves the valve seat 29 upward and the control valve 17 will tend to follow the valve seat, and more particularly the piston 27. Thus, while the control spring 32 is initially compressed in order to permit opening of the control valve 17, this initial compression is ordinarily substantially relieved by virtue of the upward movement of the control valve permitting the retainer 38 to move upwardly and lengthening the string.

By adjusting the screw 42, the initial compression on spring 32 may be closely controlled and set to any desired value within a wide range. The relief valve is, therefore, adaptable to use under a wide variety of operating conditions, particularly since the area of the control surface is relatively small as compared with the area of the valve 12.

Where herein the various parts of this invention have been referred to as being located in a right or a left position, or an upper or lower position, it will be understood that this is done solely for the purpose of facilitating description and such references relate only to the relative positions of the parts as shown in the accompanying drawings.

While but one embodiment of this invention has been shown and described, it will be understood that many changes and modifications may be made therein without departing from the spirit or scope of the invention.

What is claimed is:

1. A relief valve assembly for a hydraulic system including a housing having an inlet port, an outlet port and a chamber interconnecting said ports, a relief valve positioned in said chamber and effective when seated to prevent communication between said ports, a piston connected with said relief valve and effective in response to application of system pressure to a motive surface thereof to open said relief valve, a control valve exposed to system pressure for controlling application of system pressure to said piston, said control valve being movable to open position to apply system pressure to said piston, said control valve including a stem portion and a separate stem member bearing against an end of said stem portion, a first pressure responsive surface being defined by the control valve portion exposed to system pressure, a second pressure responsive surface on said stem portion, and a third oppositely directed pressure responsive surface being defined by said separate stem member, said second and third surfaces being exposed to system pressure upon opening of said control valve, the respective areas of said three surfaces being selected so that the second pressure responsive area is substantially equal to the area of the third pressure responsive surface whereby the force produced by said second pressure responsive area is opposed and nullified by the force produced by said third pressure responsive area in response to system pressure on said second and third surface areas upon opening of said control valve.

2. A relief valve assembly for a hydraulic system including a housing having an inlet port, an outlet port and a chamber interconnecting said ports, a relief valve positioned in said chamber and effective when seated to prevent communication between said ports, a piston connection with said relief valve and effective in response to application of system pressure to a motive surface thereof to open said relief valve, a control valve exposed to system pressure for controlling application of system pressure to said piston, said control valve being movable to open position to apply system pressure to said piston, said control valve including a stem portion and a separate stem member bearing against an end of said stem portion, a first pressure responsive surface being defined by the control valve portion exposed to system pressure, a second pressure responsive surface on said stem portion, and a third, oppositely directed pressure responsive surface being defined by said separate stem member, the respective areas being selected so that the second pressure responsive area is substantially equal to the area of the third pressure responsive surface, said second and third surfaces being exposed to system pressure upon opening of said control valve whereby the force produced by said second pressure responsive area is opposed and nullified by the force produced by the said third pressure responsive area, a spring associated with said control valve and urging said control valve toward closed position with a predetermined pressure, said control valve when opening tending to compress said spring, the nullification of said second and third surfaces allowing said spring to oppose only said first pressure responsive area, supporting means associated with one end of said spring and mounted on said housing whereby the location of said one end of said spring may be predetermined, and supporting means connected with the other end of said spring and movable in response to movement of said piston whereby the working length of said spring is maintained substantially constant despite opening of the said control valve.

3. A relief valve assembly for a hydraulic system including a housing having an inlet port, an outlet port and a chamber interconnecting said ports, a relief valve positioned in said chamber and effective when seated to prevent communication between said ports, a piston connected with said relief valve and effective in response to application of system pressure to a motive surface thereof to open said relief valve, a control valve connected with said piston and exposed to system pressure for controlling application of system pressure to said piston, said control valve being movable to open position to apply system pressure to said piston, said control valve including a stem portion and a separate stem member bearing against an end of said stem portion, a first pressure responsive surface being defined by the control valve portion exposed to system pressure, a second pressure responsive surface on said stem portion and subject to inlet pressure for directing a force in a direction urging said valve towards open position, and a separate member connected to said stem member having a third pressure responsive surface subject to inlet pressure and oppositely directed relative to said second pressure responsive surface, the effective force of which is defined by said separate stem member for urging said control valve toward closed position, the effective areas of said second and third surfaces being equal.

References Cited in the file of this patent

UNITED STATES PATENTS

| Number | Name | Date |
| --- | --- | --- |
| 108,345 | Goll | Oct. 18, 1870 |
| 140,194 | Hague | June 24, 1873 |
| 715,707 | Tippett | Dec. 9, 1902 |
| 1,262,355 | Kiesel | Apr. 9, 1918 |
| 2,122,706 | Armstrong | July 5, 1938 |